United States Patent
O'Brien et al.

(10) Patent No.: US 9,959,058 B1
(45) Date of Patent: May 1, 2018

(54) UTILIZING FLASH OPTIMIZED LAYOUTS WHICH MINIMIZE WEAR OF INTERNAL FLASH MEMORY OF SOLID STATE DRIVES

(71) Applicant: EMC Corporation, Hopkinton, MA (US)

(72) Inventors: Walter O'Brien, Westborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

(21) Appl. No.: 15/086,508

(22) Filed: Mar. 31, 2016

(51) Int. Cl.
*G06F 12/00* (2006.01)
*G06F 13/00* (2006.01)
*G06F 13/28* (2006.01)
*G06F 3/06* (2006.01)
*G06F 12/1009* (2016.01)

(52) U.S. Cl.
CPC .......... *G06F 3/0616* (2013.01); *G06F 3/0608* (2013.01); *G06F 3/0659* (2013.01); *G06F 3/0688* (2013.01); *G06F 12/1009* (2013.01); *G06F 2212/1036* (2013.01);
(Continued)

(58) Field of Classification Search
CPC . G06F 3/00; G06F 3/06; G06F 3/0601; G06F 3/0602; G06F 3/0608; G06F 3/0614; G06F 3/0616–3/0619; G06F 3/0628–3/0658; G06F 3/0659–3/0667; G06F 3/0668–3/0688; G06F 3/0689; G06F 12/00–12/0246; G06F 12/0284; G06F 12/0292; G06F 12/0804; G06F 12/0866; G06F 12/10; G06F 12/1009–12/1063; G06F 2003/0691–2003/0698;
(Continued)

(56) References Cited

U.S. PATENT DOCUMENTS 4,654,819 A * 3/1987 Stiffler ................ G06F 11/1435
711/162
5,420,998 A * 5/1995 Horning ................ G06F 3/0613
711/113
(Continued)

OTHER PUBLICATIONS

Adaptive Data Migration in Multi-tiered Storage Based Cloud Environment; Zhang et al; 3rd International Conference on Cloud Computing; Jul. 5-10, 2010; pp. 148-155 (8 pages) (Year: 2010).*
(Continued)

*Primary Examiner* — Daniel C Chappell
(74) *Attorney, Agent, or Firm* — BainwoodHuang

(57) ABSTRACT

A technique is directed to managing data. The technique involves identifying a logical page size utilized by a set of SSDs and, based on a first data storage application which stores first data elements in a set of hard disk drives (HDDs), creating a second data storage application which stores second data elements in the set of SSDs. Each first data element has a first size which is larger than the logical page size utilized by the set of SSDs. Each second data element has a second size which is equal to the logical page size utilized by the set of SSDs. The technique further involves operating, by processing circuitry coupled to the set of SSDs, the second application to store the second data elements in the set of SSDs. Such a technique is well-suited for a data storage system that stores host data in an array of SSDs.

22 Claims, 6 Drawing Sheets

(52) U.S. Cl.
CPC .. *G06F 2212/152* (2013.01); *G06F 2212/214* (2013.01); *G06F 2212/7201* (2013.01)

(58) Field of Classification Search
CPC .................. G06F 2211/00–2211/902; G06F 2212/00–2212/7211
See application file for complete search history.

(56) References Cited

U.S. PATENT DOCUMENTS

| | | | |
|---|---|---|---|
| 8,046,551 B1* | 10/2011 | Sahin | G06F 11/2074 711/162 |
| 8,930,648 B1* | 1/2015 | Storer | G06F 12/0292 711/154 |
| 8,996,478 B2* | 3/2015 | Chandrasekarasastry | G06F 12/02 707/692 |
| 9,274,944 B2 | 3/2016 | Cherubini et al. | |
| 9,286,210 B2 | 3/2016 | Tanaka et al. | |
| 9,304,904 B2 | 4/2016 | Smith et al. | |
| 9,304,905 B2 | 4/2016 | Kwon et al. | |
| 9,329,991 B2 | 5/2016 | Cohen et al. | |
| 9,342,260 B2 | 5/2016 | Schuette et al. | |
| 9,361,987 B2 | 6/2016 | Cornwell et al. | |
| 9,372,790 B2 | 6/2016 | Lee et al. | |
| 9,798,728 B2* | 10/2017 | Zheng | G06F 17/30159 |
| 2008/0235432 A1* | 9/2008 | Chen | G06F 12/0246 711/100 |
| 2010/0199036 A1* | 8/2010 | Siewert | G06F 3/0613 711/112 |
| 2010/0281230 A1* | 11/2010 | Rabii | G06F 3/0605 711/165 |
| 2011/0035548 A1* | 2/2011 | Kimmel | G06F 3/061 711/114 |
| 2011/0099326 A1* | 4/2011 | Jung | G06F 12/0246 711/103 |
| 2011/0138112 A1* | 6/2011 | Chiang | G06F 3/0664 711/103 |
| 2011/0191520 A1* | 8/2011 | Kano | G06F 3/0613 711/102 |
| 2011/0320865 A1* | 12/2011 | Jain | G06F 11/1088 714/6.22 |
| 2012/0166403 A1* | 6/2012 | Kim | G06F 17/30156 707/692 |
| 2014/0201423 A1* | 7/2014 | Jean | G06F 12/0246 711/103 |
| 2014/0289449 A1* | 9/2014 | Ogata | G06F 3/061 711/103 |
| 2015/0268867 A1* | 9/2015 | Oe | G06F 3/0608 711/103 |
| 2015/0278013 A1* | 10/2015 | Rao | G11C 16/3495 714/6.2 |
| 2017/0052713 A1* | 2/2017 | Katiyar | G06F 3/0611 |

OTHER PUBLICATIONS

LiU: Hiding Disk Access Latency for HPC Applications with a New SSD-Enabled Data Layout; Huang et al; 21st International Symposium on Modeling, Analysis & Simulation of Computer and Telecommunication Systems; Aug. 14-16, 2013; pp. 111-120 (10 pages) (Year: 2013).*

PSA: a performance and space-aware data layout scheme for hybrid parallel file systems; He et al; Proceedings of the 2014 International Workshop on Data Intensive Scalable Computing Systems; Nov. 16-21, 2014; pp. 41-48 (8 pages) (Year: 2014).*

WOW: Wise Ordering for Writes—Combining Spatial and Temporal Locality in Non-Volatile Caches; Gill et al; 4th USENIX Conference on File and Storage Technologies; 2005; retrieved from https://www.usenix.org/legacy/events/fast05/tech/full_papers/gill/gill.pdf on Jan. 16, 2018; pp. 129-142 (14 pages) (Year: 2005).*

* cited by examiner

UTILIZING FLASH OPTIMIZED LAYOUTS WHICH MINIMIZE WEAR OF INTERNAL FLASH MEMORY OF SOLID STATE DRIVES

BACKGROUND

A conventional data storage system executes data storage software that reads data from and writes data to an array of hard disk drives (HDDs). Some data storage software provides block-based storage while other data storage software provides file-based storage.

When the data storage software writes data to a HDD of the array, much of the write time is related to the mechanical nature of rotating platters and moving heads of the HDD. That is, much of the time is spent waiting for HDD components to travel to particular locations, and the time to actually write data to the HDD is only a small portion of the overall write time. As a result, the time to write data is virtually the same regardless of whether the write operation writes an 8 kilobyte (KB) block of data or a 16 KB block of data. Consequently, software algorithms optimized for use with HDDs commonly write larger blocks of data to minimize the number of input/output (I/O) operations. For example, rather than performing multiple 8 KB write operations, the data storage software can perform a single 16 KB write operation in roughly the same amount of time.

SUMMARY

Unfortunately, there are deficiencies to the above-described conventional data storage systems that use data storage software which is optimized to write larger blocks of data to minimize the number of input/output (I/O) operations. In particular, such conventional systems tend to cause unnecessary wear on solid state drives (SSDs) and thus reduce the operating life of the SSDs since only a limited number of writes can be performed on each page of SSD memory. Along these lines, modifying less than a page of SSD memory by such a conventional system may often result in writing the entire page.

For example, suppose that the data storage software routinely writes 8 KB blocks to an array of hard disk drive (HDDs). Further suppose that each 8 KB block not only includes regular data starting at the beginning of the 8 KB block, but also includes a checksum aligned at the end of that 8 KB block. In such a situation, if the data storage software merely modifies a few bytes of data near the beginning of an 8 KB block (i.e., in the upper half of the 8 KB block), the data storage software further updates the checksum at the end of the 8 KB block (i.e., in the lower half of the 8 KB block). Then, the data storage software provides the entire 8 KB block to a HDD, and the HDD writes the entire 8 KB block to magnetic storage.

However, suppose that the same data storage software is now used to perform the same operation on a SSD which internally stores data using 4 KB granularity. That is, the SSD is able to store data in 4 KB pages within internal flash memory. Here, even though the data storage software changes only a few bytes of data as well as the checksum of the 8 KB block, the data storage software still provides the entire 8 KB block to the SSD which responds by writing two 4 KB pages in the internal flash memory, i.e., one 4 KB page to hold the upper half of the 8 KB block containing the few bytes that have changed and another 4 KB page to hold the lower half of the 8 KB block containing the new checksum. Unfortunately, even though less than 4 KB of data may have been modified, such operation writes two 4 KB pages of internal flash memory of the SSD thus causing excessive wear of the internal flash memory and unnecessarily shortening the life of the SSD.

In contrast to the above-described conventional data storage system which uses software that is optimized to write larger blocks of data to minimize the number of I/O operations, improved techniques are directed to utilizing flash optimized data layouts which minimize wear of internal flash memory of SSDs. In particular, data elements which are written to the SSDs are sized so that small data modifications may result in writes of only a single SSD page of the internal flash memory. Such operation causes less data to be written and thus less flash memory wear. Accordingly, the lifespans of the SSDs are extended.

One embodiment is directed to a method of managing data. The method includes identifying a logical page size utilized by a set of SSDs and, based on a first data storage application which stores first data elements in a set of hard disk drives (HDDs), creating a second data storage application which stores second data elements in the set of SSDs. Each first data element has a first size which is larger than the logical page size utilized by the set of SSDs. Each second data element has a second size which is equal to the logical page size utilized by the set of SSDs. The method further includes operating, by processing circuitry coupled to the set of SSDs, the second data storage application to store the second data elements in the set of SSDs.

In some arrangements, each SSD includes a SSD controller and internal flash memory. In these arrangements, identifying the logical page size utilized by the set of SSDs includes ascertaining, as the logical page size, a smallest unit of data that the SSD controller of each SSD can write to the internal flash memory of that SSD.

In some arrangements, the SSD controller of each SSD manages a flash translation layer (FTL) which maps logical addresses to physical addresses of the internal flash memory of that SSD. In these arrangements, ascertaining the smallest unit of data that the SSD controller of each SSD can write includes discerning, as the logical page size, a mapping granularity utilized by the FTL managed by the SSD controller of each SSD. It should be understood that this logical page size value of the SSDs may be specified in a variety of ways (e.g., read electronically from each SSD, communicated electronically from a website, specified by the manufacturer, and so on).

In some arrangements, creating the second data storage application includes setting the second size of each second data element stored by the second data storage application to be 4 KB. Other sizes are suitable for use as well depending on the logical page size of the SSDs (e.g., 2 KB, 8 KB, etc.).

In some arrangements, creating the second data storage application includes generating, as the second data storage application, a data moving application which moves data from a cache (or buffer) to the set of SSDs. The data may be regular data and/or metadata (e.g., data used only the data moving application, operating system data, and so on). Along these lines, the second data storage application simply be a modified version of the first data storage application (e.g., where one or more operating parameters are adjusted to provide the flash optimized layouts. Alternatively, the source code of the first data storage application may be modified (e.g., new data structure definitions, new variable types, etc.) and then the second data storage application may be built from the modified source code. Other arrangements are suitable for use as well (e.g., driver replacement, firmware upgrade, data translation/migration, library upgrades, re-linking applications, combinations thereof, etc.).

In some arrangements, operating the second data storage application includes installing the data moving application on a set of storage processors of a data storage array. Along these lines, the data moving application performs host input/output (I/O) operations which store host data in the set of SSDs and load host data from the set of SSDs on behalf of a set of external host computers. The second data storage application may replace the first data storage application on the same data storage hardware. Additionally, the second data storage application may be used going forward on new data storage hardware deployments.

In some arrangements, generating the data moving application includes configuring the data moving application to store, in particular second data elements, (i) respective information and (ii) an error detection code (EDC) for detecting errors in that respective information. For example, the respective information of each data element may be boundary aligned with the beginning of that data element and the EDC may be boundary aligned with the end of that data element. In particular arrangements, the first data storage application stores, in particular first data elements, (i) respective information and (ii) an error detection code for detecting errors in that respective information. In these arrangements, each particular first data element is too large to fit in any of the particular second data elements.

In some arrangements, generating the data moving application includes configuring the data moving application to store, in particular second data elements, (i) a respective bitmap (or index table) and (ii) a series of entries which is fully mapped by the respective bitmap. For example, the respective bitmap of each data element may be boundary aligned with the beginning of that data element and the series of entries may be boundary aligned with the end of the data element. In particular arrangements, the first data storage application stores, in particular first data elements, (i) a respective bitmap and (ii) a series of entries which is fully mapped by the respective bitmap. In these arrangements, each particular first data element is too large to fit in any of the particular second data elements.

In some arrangements, generating the data moving application include configuring the data moving application to store, in particular second data elements, (i) a respective data object and (ii) ancillary data which is different than that respective data object. For example, the respective data object of each data element may be boundary aligned with the beginning of that data element and the ancillary data may be boundary aligned with the end of the data element. In particular arrangements, the first data storage application stores, in particular first data elements, (i) a respective data object and (ii) ancillary data which is different than that respective data object. In these arrangements, each particular first data element is too large to fit in any of the particular second data elements.

Another embodiment is directed to an electronic apparatus which includes an interface constructed and arranged to connect with a set of SSDs, memory, and control circuitry coupled to the interface and the memory. The memory stores instructions which, when carried out by the control circuitry, cause the control circuitry to (i) after a logical page size utilized by a set of solid state drives SSDs is identified and (ii) after, based on a first data storage application which stores first data elements in a set of hard disk drives (HDDs), a second data storage application is created which stores second data elements in the set of SSDs, operate the second data storage application to store the second data elements in the set of SSDs. Each first data element has a first size which is larger than the logical page size utilized by the set of SSDs. Each second data element has a second size which is equal to the logical page size utilized by the set of SSDs.

Yet another embodiment is directed to a computer program product having a non-transitory computer readable medium which stores a set of instructions to manage data. The set of instructions, when carried out by computerized circuitry, causing the computerized circuitry to perform a method of:

(A) identifying a logical page size utilized by a set of solid state drives (SSDs);
(B) based on a first data storage application which stores first data elements in a set of hard disk drives (HDDs), creating a second data storage application which stores second data elements in the set of SSDs, each first data element having a first size which is larger than the logical page size utilized by the set of SSDs, and each second data element having a second size which is equal to the logical page size utilized by the set of SSDs; and
(C) operating the second data storage application to store the second data elements in the set of SSDs.

It should be understood that, in the cloud context, at least some of the electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in utilizing flash optimized data layouts which minimize wear of internal flash memory of SSDs.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to utilizing flash optimized data layouts which minimize wear of internal flash memory. In particular, in the context of computerized data storage, data elements which are written to solid state drives (SSDs) are sized so that a small data modification may result in writing only a single SSD page of the internal flash memory. Such operation causes less data to be written to the internal flash memory of the SSDs compared to an approach of writing larger blocks resulting in writes of multiple SSD pages, as is done by conventional data storage systems that are optimized for hard disk drives (HDDs) by minimizing the number of input/output (I/O) operations to the HDDs. Accordingly, the improved technique provides less flash memory wear on SSDs, and the lifespans of the SSDs are extended.

Figure 1:
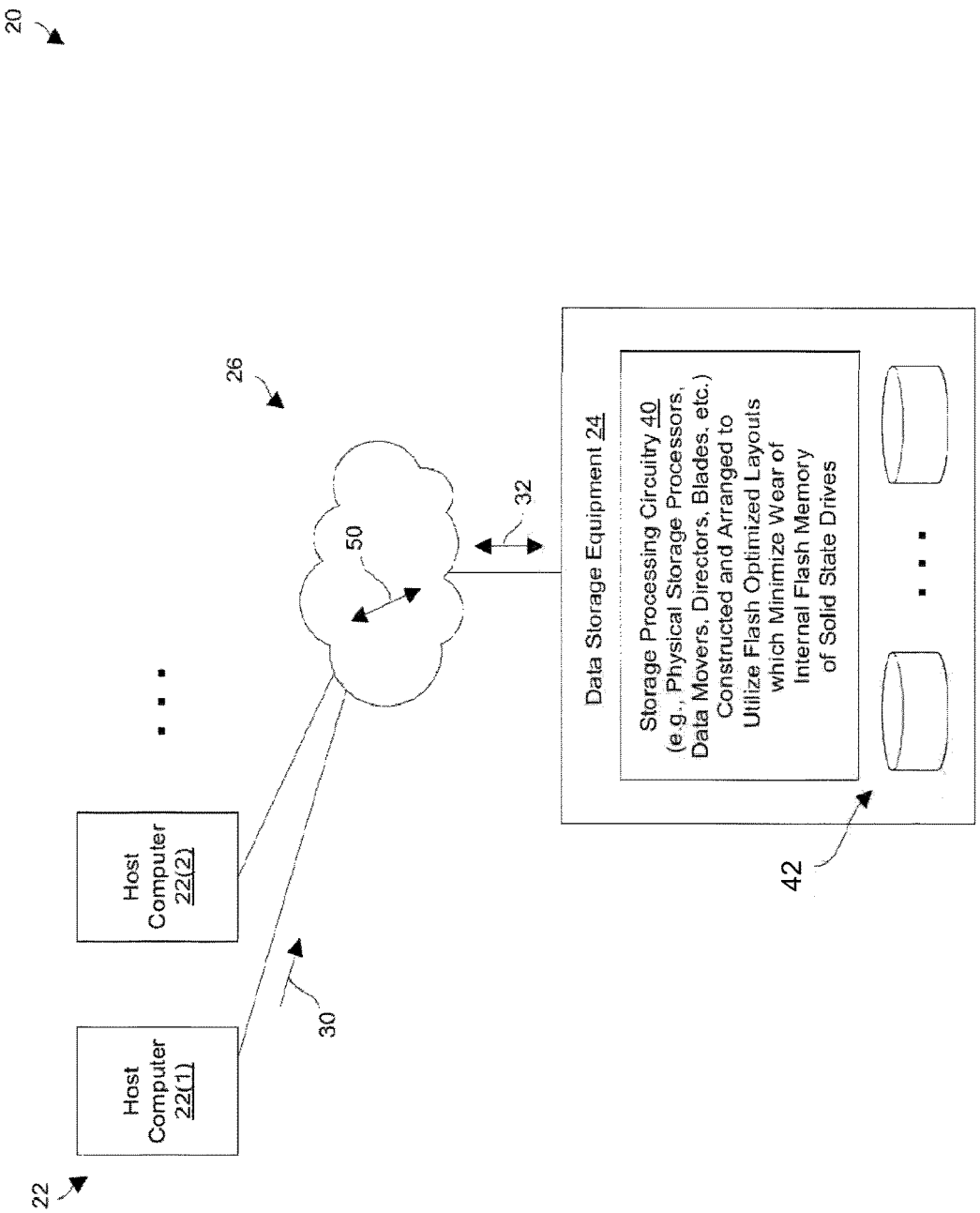
FIG. 1 is a block diagram of a data storage environment which is suitable for use in utilizing flash optimized data layouts which minimize wear of internal flash memory of solid state drives.

FIG. 1 is a block diagram of a data storage environment 20 which is suitable for use in utilizing flash optimized data layouts which minimize wear of internal flash memory of SSDs. The data storage environment 20 includes host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, and so on, which provides I/O requests 30 (e.g., small computer system interface or SCSI commands) to the data storage equipment 24 to store host data 32 in and read host data 32 from the data storage equipment 24.

The data storage equipment 24 is constructed and arranged to provide access to the host data 32 in response to the I/O requests 30 from the host computers 22. As shown, the data storage equipment 24 includes storage processing circuitry 40 and storage devices 42.

The storage processing circuitry 40 may include one or more physical storage processors, data movers, director boards, blades, I/O modules, storage drive controllers, switches, combinations thereof, and so on. The storage processing circuitry 40 is constructed and arranged to process the I/O requests 30 from the host computers 22 by robustly and reliably storing host data 32 in the storage devices 42 and retrieving the host data 32 from the storage devices 42.

The storage devices 42 include a set of SSDs 44 which persistently stores the host data 32. Suitable SSDs include single-level cell (SLC) flash memory SSDs, multi-level cell (MLC) flash memory SSDs (e.g., four states per cell, eight states per cell, etc.), NAND type flash, NOR type flash, combinations thereof, and so on. It should be understood that the disk shapes in FIG. 1 are provided to illustrate storage generally, but that the actual form factor for each SSD 44 may be that of a traditional HDD, a circuit board module, a memory card, an external device, and so on. In some arrangements, the storage devices 42 are exclusively SSDs 44 (i.e., all flash). In other arrangements, the storage devices 42 include SSDs as well as HDDs (i.e., magnetic disk drives) which can be arranged in different data storage tiers.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, combinations thereof, and so on.

During operation, the storage processing circuitry 40 uses flash optimized data layouts which minimize wear of internal flash memory. In some arrangements, the storage processing circuitry 40 exclusively uses flash optimized data layouts regardless of the ultimate storage medium; such an arrangement lends itself to simple upgrading from HDDs to SSDs over time without need to distinguish between HDDs and SSDs. In other arrangements, the storage processing circuitry 40 is selective in that the flash optimized data layouts are used when writing data to SSDs and HDD optimized layouts are used when writing data to HDDs (e.g., writing large blocks to HDDs to minimize I/Os); such an arrangement lends itself well to efficient operation of hybrid storage. In some arrangements, a new data storage application which uses the flash optimized layout executes on the same hardware along side another data storage application (e.g., a legacy application) which uses HDD optimized layouts. Further details will now be provided with reference to FIG. 2.

Figure 2:
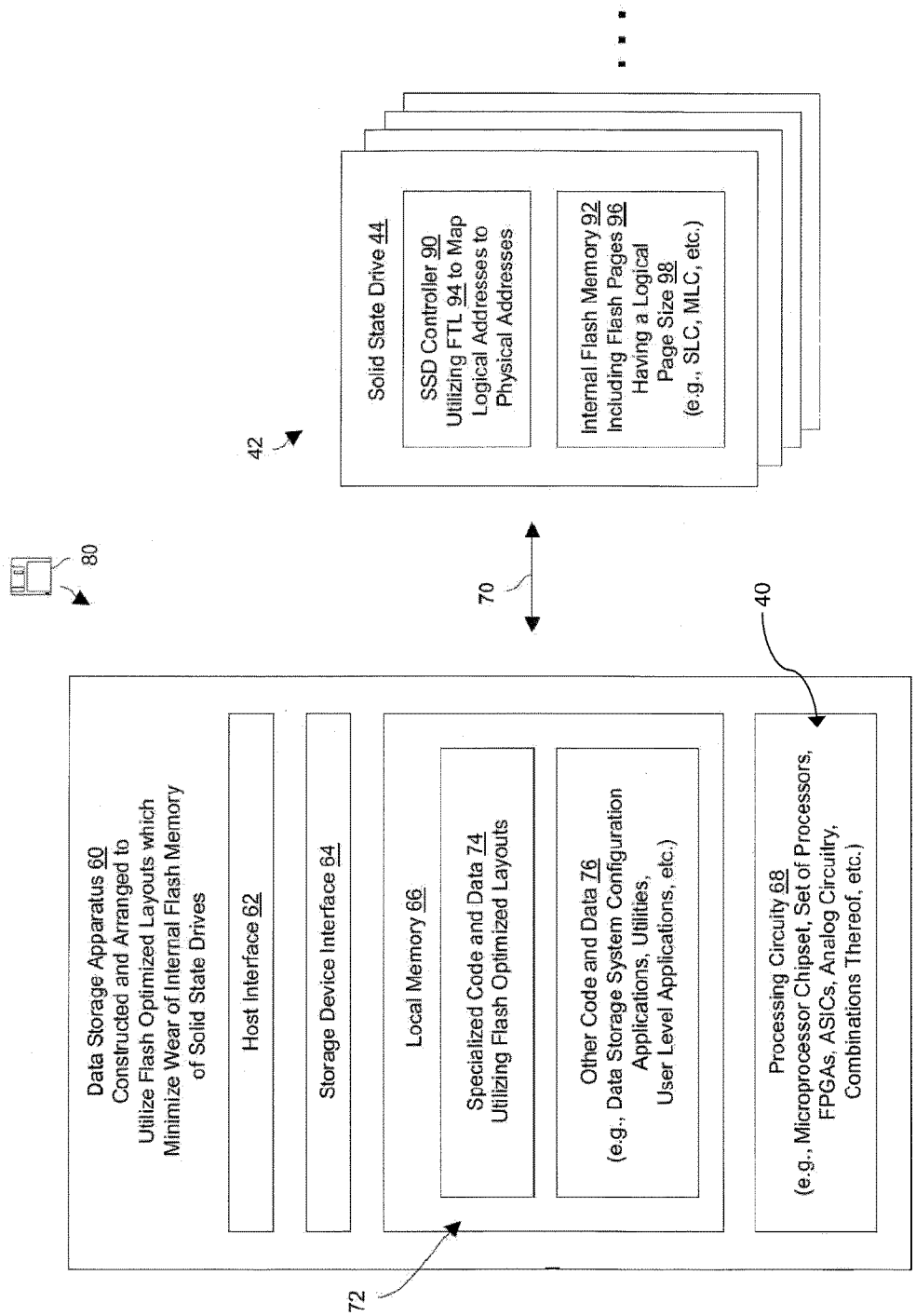
FIG. 2 is a block diagram of specialized data storage equipment of the data storage environment of FIG. 1.

FIG. 2 shows particular details of a data storage apparatus 60 which utilizes flash optimized layouts when writing data to SSDs 44. The data storage apparatus 60 is suitable for forming at least a portion of the specialized data storage equipment 24 of the data storage environment 20 (also see FIG. 1).

As shown, the data storage apparatus 60 includes a host interface 62, a storage device interface 64, local memory 66, and processing circuitry 68. Although the SSDs 44 of the storage devices 42 (FIG. 1) are shown as being separate from the data storage apparatus 60, the SSDs 44 may be tightly integrated with the data storage apparatus 60 (e.g., share the same enclosure or chassis, communicate via a high speed bus, etc.). Alternatively, the SSDs 44 may be remote from or external to the data storage apparatus 60 (e.g., reside in a separate cabinet, communicate via switches and cabling, etc.). In some arrangements, some SSDs 44 are tightly integrated with the data storage apparatus 60 while other SSDs 44 are remote from the data storage apparatus 60.

The host interface 62 is constructed and arranged to connect the data storage apparatus 60 to the communications medium 26 (FIG. 1) to enable access to other devices of the data storage environment 20 (e.g., see the host computers 22). Such communications may be SAN-based, IP-based, cellular-based, cable-based, fiber-optic based, wireless, cloud-based, combinations thereof, and so on. Accordingly, the communications interface 62 enables the data storage apparatus 60 to robustly and reliably communicate with other external apparatus.

The storage device interface 64 is constructed and arranged to connect the data storage apparatus 60 to the storage devices 42 including the SSDs 44. In particular, the storage device interface 64 is able to issue read and write instructions 70 in accordance with various storage protocols (e.g., SATA, PCIe, SAS, USB, RapidIO, FireWire, etc.).

The local memory 66 is intended to represent both volatile storage (e.g., DRAM, SRAM, etc.) and non-volatile storage (e.g., flash memory, magnetic memory, etc.). In some arrangements, at least a portion of the local memory 66 includes SSDs 44. The local memory 66 stores a variety of software constructs 72 including specialized code and data 74, and other code and data 76. The specialized code and data 74 is intended to represent a set of instructions that directs the processing circuitry 68 to perform read and write operations on the storage devices 42. The other code and data 76 refers generally to instructions that direct the processing circuitry 66 to perform various other operations, e.g., administrative tools, utilities, other user-level applications, and so on. In some arrangements, the specialized code and data 74 forms a portion of an operating system which manages computerized resources of the apparatus 60 (e.g., processor cycles, memory space, etc.). In other arrangements, the specialized code and data 74 is separate from the operating system (e.g., the other code and data 76 represents the operating system among other things).

The processing circuitry 68 is constructed and arranged to operate in accordance with the various software constructs 72 stored in the local memory 66. As will be explained in further detail shortly, the processing circuitry 68 when operating in accordance with the specialized code and data 74, forms specialized control circuitry that utilizes the flash optimized layouts. Along these lines, the combination of the local memory 66 and the processing circuitry 68 may form at least a portion of the earlier-mentioned storage processing circuitry 40 (also see FIG. 1).

Such processing circuitry 68 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the processing circuitry 68. In particular, the computer program product 80 has a non-transitory (or non-volatile) computer readable medium which stores a set of instructions which controls one or more operations of the processing circuitry 68. Examples of suitable computer readable storage media include tangible articles of manufacture and apparatus which store instructions in a non-volatile manner such as CD-ROM, flash memory, disk memory, tape memory, and the like.

As further shown in FIG. 2, each SSD 44 includes a SSD controller 90 and internal flash memory 92. The SSD controller 90 is constructed and arranged to manage data stored in the internal flash memory 92, and the internal flash memory 92 is constructed and arranged to persistently store that data. Such data may include host data 32 from the host computers 22, operating system data, metadata, backups/archives/copies, data from other equipment, and so on.

To manage such data, the SSD controller 90 employs a flash translation layer (FTL) 94 which maps logical addresses of the read and write instructions 70 to particular internal flash memory pages (or flash pages) 96 at a particular mapping granularity, i.e., the smallest unit of data that the SSD controller 90 can write to the internal flash memory 92 (e.g., 2 KB, 4 KB, 8 KB, etc.). This mapping granularity is referred to as the logical page size 98 of the SSD 44. In some arrangements, the mapping units of the FTL 94 not only map logical addresses to flash pages 96, but also provide block-based mapping, sub-page-based mapping, and so on.

Each SSD 44 has such a construction and operates in this manner. Further details will now be provided with reference to FIGS. 3-5.

Figure 3:
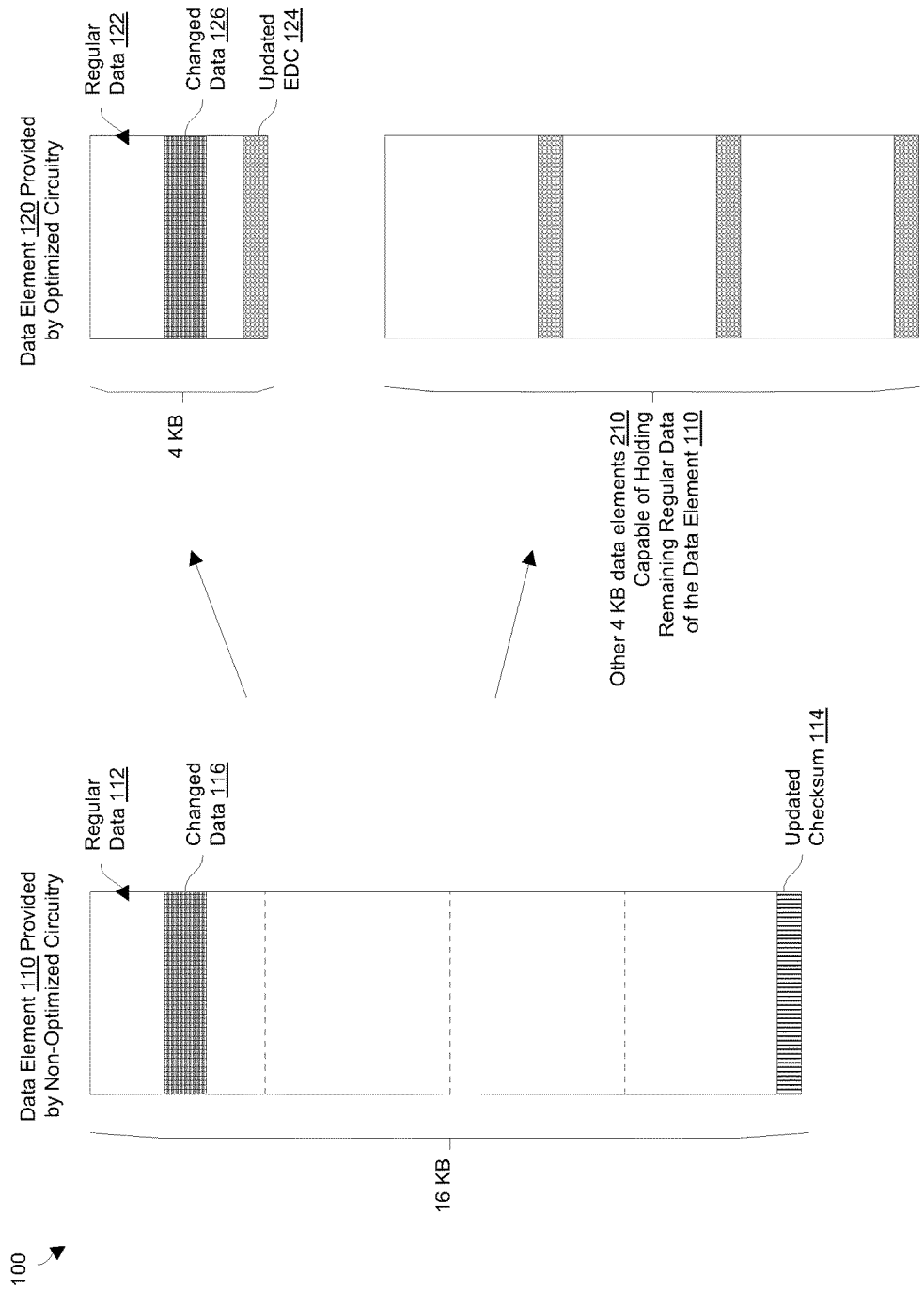
FIG. 3 is a block diagram illustrating a first example relating to the specialized data storage equipment of FIG. 2.
Figure 4:
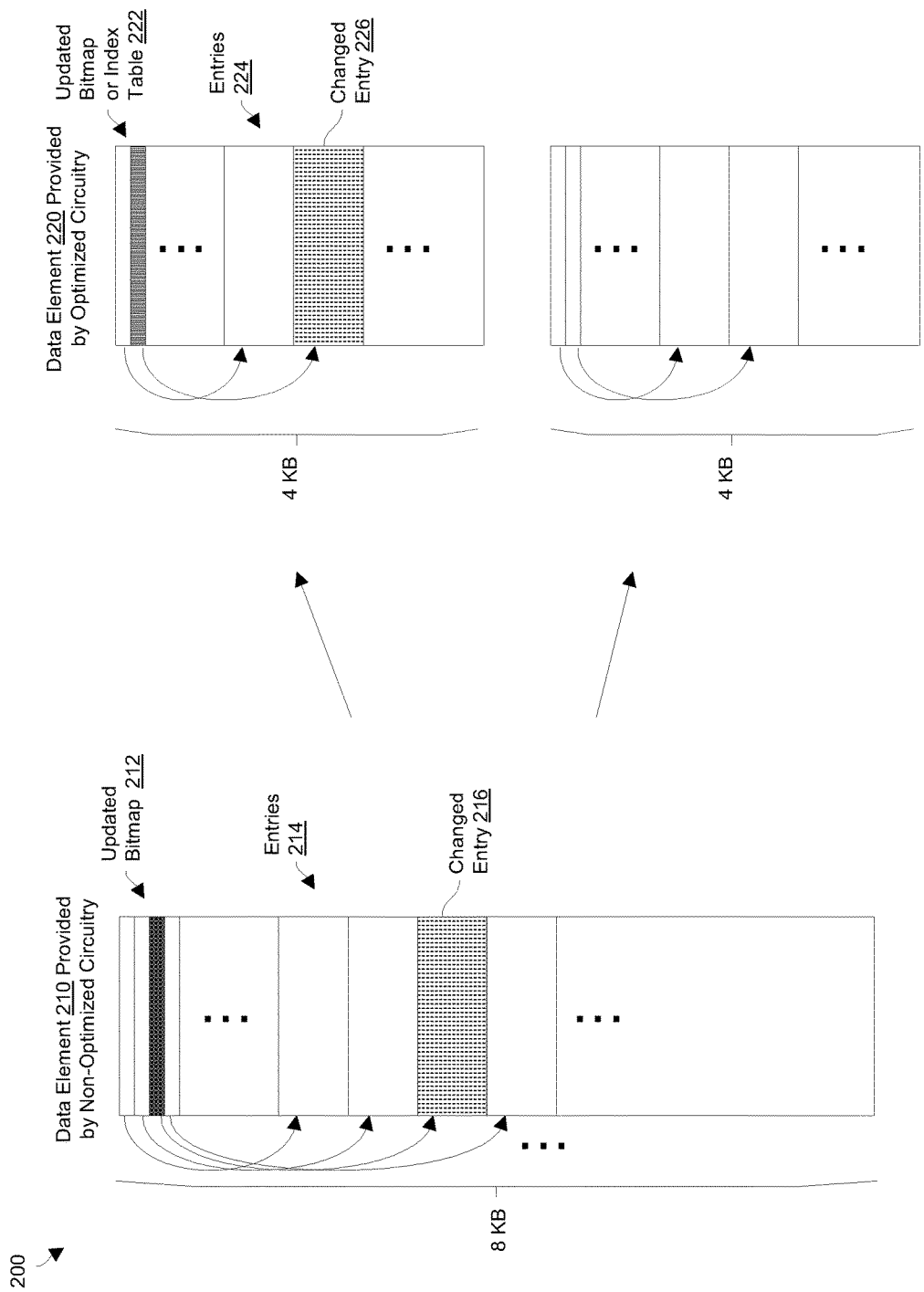
FIG. 4 is a block diagram illustrating a second example relating to the specialized data storage equipment of FIG. 2.
Figure 5:
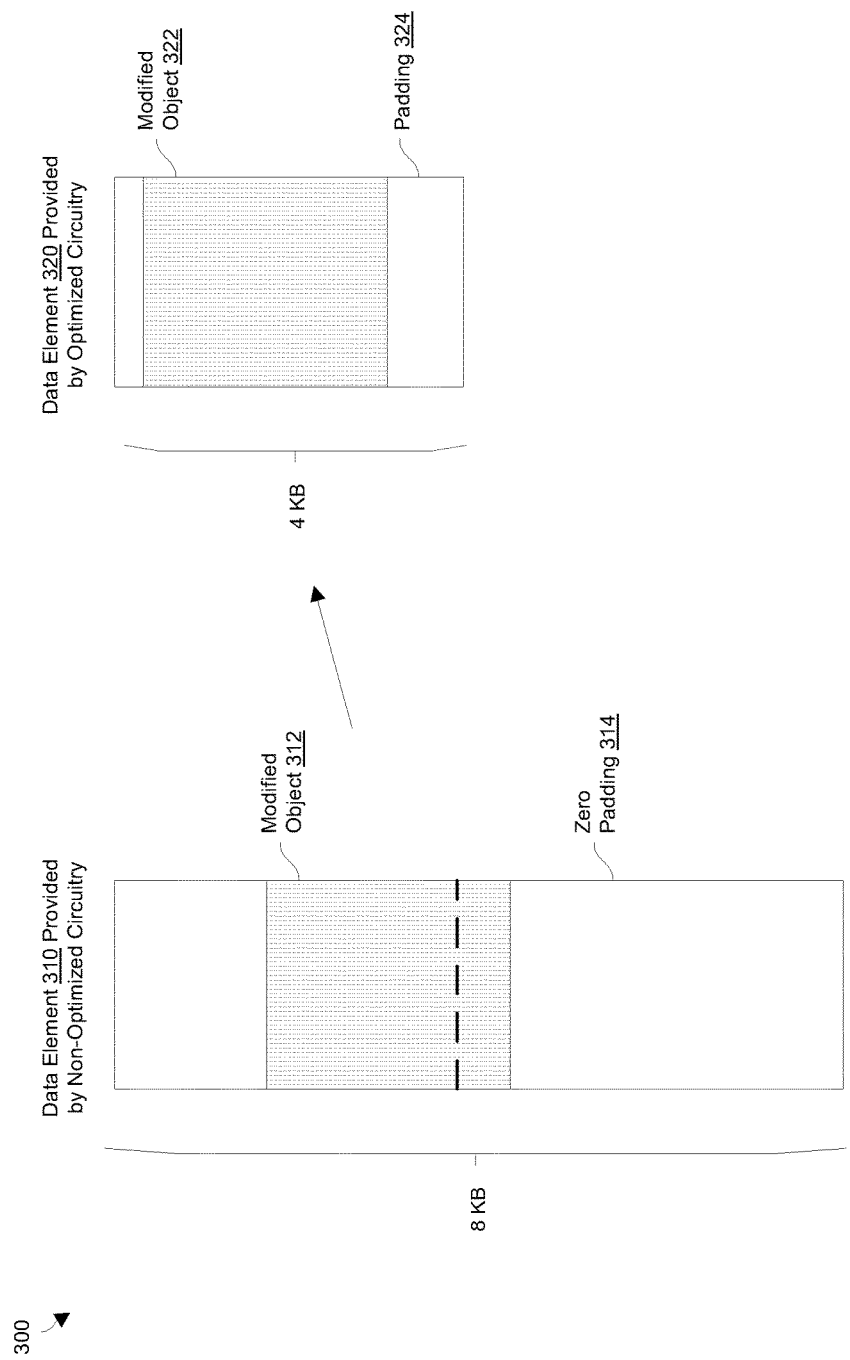
FIG. 5 is a block diagram illustrating a third example relating to the specialized data storage equipment of FIG. 2.

FIGS. 3-5 provide a series of examples showing how certain flash optimized layouts minimize wear of the internal flash memory 92 of the SSDs 44. In the examples of FIGS. 3-5, the logical page size is 4 KB by way of example only. FIG. 3 shows a first compare/contrast example involving regular data and error detection codes (EDCs). FIG. 4 shows a second compare/contrast example involving bitmaps (or index tables) and a series of entries. FIG. 5 shows a third compare/contrast example involving object alignment within a padded data structure.

With reference to a first example 100 in FIG. 3, a data element 110 is shown which is provided by non-optimized circuitry (e.g., a conventional data storage system running a legacy data storage application). As shown, the data element 110 is 16 KB in size. For illustration purposes only, dashed lines delineate the data element 110 into four 4 KB segments. In this example 100, suppose that the data element 110 includes regular data 112 starting at the beginning of the data element 110, and a checksum 114 which is aligned at the end of the data element 110.

Now, suppose that the non-optimized circuitry changes a small amount of data 116 in the first 4 KB segment of the data element 110 (e.g., just a few bytes). In this situation, the non-optimized circuitry further updates the checksum 114 at the end of the data element 110 (e.g., the checksum is algorithmically recalculated based on the modified regular data). Then, the non-optimized circuitry provides the updated data element 110 to a storage device 42 to store in a non-volatile manner. Unfortunately, if the non-optimized circuitry is writing the data element 110 to a SSD 44 (also see FIG. 2), the internal flash memory 92 of the SSD 44 will store the entire 16 KB of data element 110 and thus write more flash memory than necessary, i.e., the operation writes four 4 KB flash pages 96 of the SSD 44.

It should be understood that the situation of having to store four 4 KB flash pages 96 exists even if the non-optimized circuitry changed just a small amount of data 116 in a different 4 KB segment. That is, in such a situation, the entire 16 KB of data element 110 is still be provided to the SSD 44 and thus four 4 KB flash pages 96 of the SSD 44 are written.

However, in contrast to the data element 110, the optimized circuitry (specialized control circuitry formed by the processing circuitry 68 operating in accordance with the specialized code and data 74, also see FIG. 2) utilizes a flash optimized data layout which minimizes wear of internal flash memory. In particular, since in this example the logical page size is 4 KB, the optimized circuitry saves regular data 122 in individual 4 KB data elements 120.

Each 4 KB data element 120 includes regular data 122 starting at the beginning of the data element 120, and an EDC 124 which is aligned at the end of that data element 120. Accordingly, the original regular data 112 of the 16 KB data element 110 can be stored as the regular data 122 distributed among separate 4 KB data elements 120, i.e., each data element 120 holding a portion of the regular data 112 and a respective EDC 124 for that portion of the regular data 102. The EDC 124 of each data element 120 is specifically derived to enable robust and reliable error detection of the respective regular data 122 in that data element 120.

With reference back to the earlier mentioned situation, suppose that the same data which is stored in the data element 110 is instead stored among four 4 KB data elements 120 used by the optimized circuitry, i.e., circuitry which utilizes a flash optimized layout. Now, suppose that the optimized circuitry changes the same small amount of data (just a few bytes) as in the data element 110, i.e., the changed data 126 is the same as the changed data 116.

As shown in FIG. 3, only one of the 4 KB data elements 120 is affected by this change. That is, the topmost data element 120 includes the changed data 126. Additionally, the optimized circuitry updates the EDC 124 at the end of that data element 120 to enable detection of an error in the regular data 122 of that data element 120.

Then, the optimized circuitry provides just that data element 120 to a storage device 42 to store in a non-volatile manner. Advantageously, if the storage device 42 is a SSD 44 (also see FIG. 2), the internal flash memory 92 of the SSD 44 will store the data element 120 in just a single 4 KB flash page 96. Accordingly, the operation writes only as much flash memory as necessary, i.e., one flash page 96 rather than four flash pages 96. The other data elements 120 holding other regular data 122 and respective EDCs 124 did not need to be written because nothing in them changed. As a result, the improved technique provides less flash memory wear on a SSD 44, and the lifespan of the SSD 44 is extended.

With reference to a second example 200 in FIG. 4, a data element 210 is shown which is provided by non-optimized circuitry. As shown, the data element 210 is 8 KB in size. In this example 200, suppose that the data element 210 includes a bitmap 212 starting at the beginning of the data element 210, and a series of entries 214 which starts after the bitmap 212 and spans the rest of the data element 210. Here, each bit of the bitmap 212 identifies a particular entry 214 in the series of entries 214.

Now, suppose that the non-optimized circuitry changes a particular entry 216 of the series of entries 214. In this situation, the non-optimized circuitry further updates the bitmap 212. Then, the non-optimized circuitry provides the data element 210 to a storage device 42 to store in a non-volatile manner. Unfortunately, if the non-optimized circuitry is writing the data element 210 to a SSD 44 (also see FIG. 2), the internal flash memory 92 of the SSD 44 will store the entire 8 KB of data element 210 and thus write more flash memory than necessary, i.e., the operation writes two flash pages 96 (each flash page being 4 KB in size) of the SSD 44.

It should be understood that the situation of having to store two 4 KB flash pages 96 exists regardless of which entry 214 is modified. That is, in the example 200, the entire 8 KB of data element 210 would still be provided to the SSD 44 because, for proper operation, the bitmap 212 identifies the whole series of entries 214 which spans the rest of the data element 210.

However, in contrast to the data element 210, the optimized circuitry utilizes a flash optimized data layout which minimizes wear of internal flash memory. In particular, since in this example the logical page size is 4 KB, the optimized circuitry saves data in individual 4 KB data elements 220.

Each 4 KB data element 220 includes a bitmap (or index table) 222 starting at the beginning of the data element 220, and a series of entries 224 which starts after the bitmap 222 and spans the rest of the data element 220. Accordingly, the original series of entries 214 of the data element 210 can be distributed among separate 4 KB data elements 220, i.e., each data element 220 holding a portion of the original series of entries 214 as entries 224 and a respective bitmap (or index table) 222 for that portion of the original series of entries 214.

With reference back to the earlier mentioned situation, suppose that the same entry 216 which is changed in the data element 210 is instead changed in one of the two 4 KB data elements 220 used by the optimized circuitry, i.e., circuitry which utilizes a flash optimized layout. Here, the optimized circuitry changes a particular entry 226 in one of the data elements 220 as well as updates the bitmap 222 of that data element 220 containing the modified entry 226. Then, the optimized circuitry provides just that data element 220 to a storage device 42 to store in a non-volatile manner. Advantageously, if the storage device 42 is a SSD 44 (also see FIG. 2), the internal flash memory 92 of the SSD 44 will store the data element 220 in just a single 4 KB flash page 96. Accordingly, the operation writes only as much flash memory as necessary, i.e., one flash page 96 rather than two flash pages 96. The entries 224 and the bitmap 222 of the other data element 220 are unchanged and thus do not need to be written. As a result, the improved technique provides less flash memory wear on a SSD 44, and the lifespan of the SSD 44 is extended.

With reference to a third example 300 in FIG. 5, a data element 310 is shown which is provided by non-optimized circuitry (e.g., a conventional data storage system running a legacy data storage application). As shown, the data element 310 is 8 KB in size. For illustration purposes only, dashed line delineates the data element 310 into two 4 KB segments. In this example 300, suppose that the data element 310 includes an object 312 that is less than the logical page size 98 of an SSD 44 and which extends across the 4 KB boundary as well as some zero padding 314.

Now, suppose that the non-optimized circuitry makes a change to the object 312. Once the object 312 is changed in the data element 310, the non-optimized circuitry provides the data element 310 to a storage device 42 to store in a non-volatile manner. Unfortunately, if the non-optimized circuitry is writing the data element 310 to a SSD 44 (also see FIG. 2), the internal flash memory 92 of the SSD 44 will store the entire 8 KB of data element 310 and thus write more flash memory than necessary, i.e., the operation writes two flash pages 96 of the SSD 44.

However, in contrast to the data element 310, the optimized circuitry (the processing circuitry 68 which operates in accordance with the specialized application and data 74) utilizes a flash optimized data layout which minimizes wear of internal flash memory. In particular, since in this example the logical page size is 4 KB and since the object is smaller than the logical page size, the optimized circuitry saves object 322 in just one 4 KB data element 320, perhaps with padding 324.

The 4 KB data element 320 is capable of holding an object 322 which is smaller than the logical page size and perhaps with zero padding. Accordingly, with reference back to the earlier mentioned situation, suppose that the same object 312 which is stored in the data element 310 is instead stored on a 4 KB data element 320 used by the optimized circuitry, i.e., circuitry which utilizes a flash optimized layout. Now, suppose that the optimized circuitry modifies the object 322. Then, the optimized circuitry provides the data element 320 to a storage device 42 to store in a non-volatile manner. Advantageously, if the storage device 42 is a SSD 44 (also see FIG. 2), the internal flash memory 92 of the SSD 44 will store the data element 320 in just a single 4 KB flash page 96. Accordingly, the operation writes only as much internal flash memory 92 as necessary, i.e., one flash page 96 rather than multiple flash pages 96. As a result, the improved technique provides less flash memory wear on a SSD 44, and the lifespan of the SSD 44 is extended.

In connection with the above-provided examples 100, 200, 300, it should be understood that, in some arrangements, the optimized circuitry is able to reformat the original data elements 110, 210, 310 to provide the data elements 120, 220, 320 having the flash optimized layout. In these arrangements, the optimized circuitry may read the original data elements 110, 210, 310 and perform a set of conversion operations to preserve the data as well as the proper functionality of the original data elements 110, 210, 310.

Additionally, initial software which provides the original data elements 110, 210, 310 can be simply reconfigured to provide the data elements 120, 220, 320. One way of accomplishing this is to redefine various aspects of the data elements utilized by the initial software (e.g., data structure sizes and types, bitmap and table sizes, object locations, etc.) and then rebuild the package to form a flash optimized application. Further details will now be provided with reference to FIG. 6.

Figure 6:
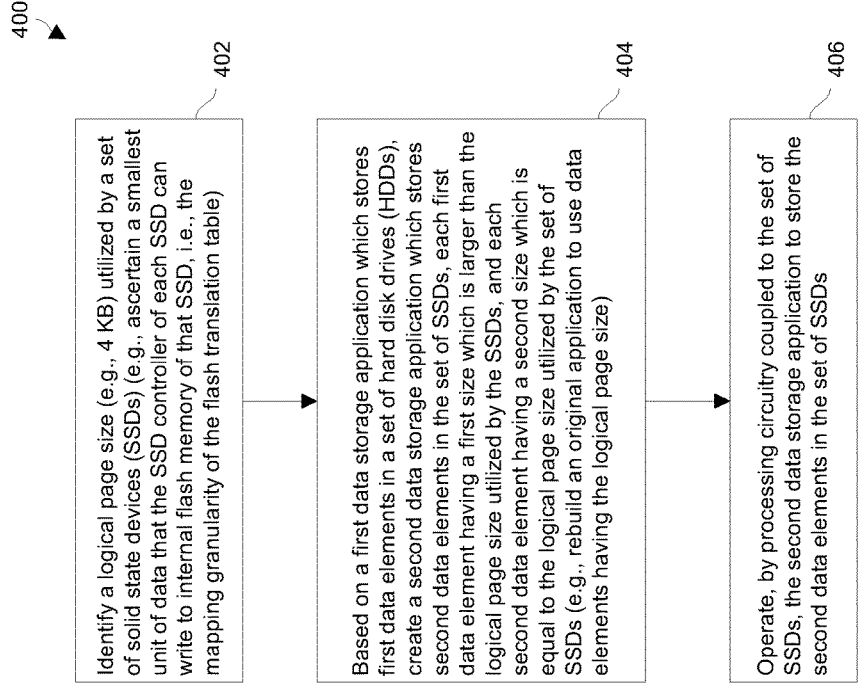
FIG. 6 is a flowchart of a procedure which is performed by the specialized data storage equipment of FIG. 2.

FIG. 6 is a flowchart of a procedure 400 which is performed by specialized data storage equipment to manage data. At 402, the equipment identifies a logical page size utilized by a set of SSDs. This logical page size is the page granularity that the SSDs use to write data to internal flash memory.

At 404, the equipment, based on a first data storage application which stores first data elements in a set of HDDs, creates a second data storage application which stores second data elements in the set of SSDs. Each first data element has a first size which is larger than the logical page size utilized by the set of SSDs. Each second data element has a second size which is equal to the logical page size utilized by the set of SSDs.

At 406, the equipment operates the second data storage application to store the second data elements in the set of SSDs. Such operation may involve installing and running the second data storage application on legacy data storage equipment (perhaps along with the first data storage application), on new data storage equipment, and so on. In contrast to the first data storage application which may be optimized to minimize the number of I/Os and thus write larger amounts of data than the logical page size, the second data storage application writes data having the logical page size thus minimizing the amount of internal flash memory written.

As described above, improved techniques are directed to utilizing flash optimized data layouts which minimize wear of internal flash memory of SSDs 44. In particular, data elements 120, 220, 320 which are written to the SSDs 44 are sized so that a small data modification results in writing only a single SSD page 96. Such operation causes less data to be written and thus less flash memory wear. Accordingly, the lifespans of the SSDs 44 are extended.

While various embodiments of the present disclosure have been particularly shown and described, it will be understood by those skilled in the art that various changes in form and details may be made therein without departing from the spirit and scope of the present disclosure as defined by the appended claims.

Along these lines, it should be understood that various components of the data storage environment 20 such as the host computers 22 are capable of being implemented in or "moved to" the cloud, i.e., to remote and/or virtual computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the data storage equipment 24 described herein is not merely a general purpose computer running user level applications. Rather, the data storage equipment 24 is specialized circuitry that primarily performs I/O operations on behalf of one or more host computers 22. Such specialized circuitry exceeds general purpose computers in terms of I/O throughput, fault tolerance, I/O load balancing, storage efficiency, data recovery, security, and so on. To this end, such specialized circuitry is capable of performing various specialized operations and providing various background services such as logical unit of storage (LUN) management, volume management, file system management, allocation/reuse/sharing of slices from storage pools, multi-tenancy, de-duplication, compression, data replication, backups, archiving, and so on.

The storage devices 42 that are employed by such data storage equipment 24 may include volatile and non-volatile memory, floppy drives, hard disk drives, tape drives, and optical drives. A storage device 42 may be locally attached to I/O channel of a computer. For example, a HDD may be connected to a computer's disk controller. A storage device 42 may also be accessible over a network. Examples of such storage devices 42 include network attached storage (NAS) and storage area network (SAN) devices. A storage device 42 may be a single stand-alone component or be comprised of a system of storage devices 42 such as in the case of Redundant Array of Inexpensive Disks (RAID) groups, i.e., collections of HDDs operating together logically as a unified storage device to provide some data protection through redundancy. Such RAID groups are typically designed to store large quantities of data and to be accessed by one or more storage array processors (SPs) that handle both requests for allocation and host I/O requests.

It should be further understood that the flash memory that is described herein may also be used in one or more multiple locations in a computer system. For example, computer systems may include different flash memory based resources used by one or more host processors. Such resources and host processors in a computer system may be interconnected by one or more communication connections. These flash memory based resources may include, for example, data storage devices such as those included in the data storage systems manufactured by EMC Corporation of Hopkinton, Mass. These data storage systems may be coupled to one or more servers or host processors (also known as hosts) and provide storage services to each host processor. Multiple data storage systems from one or more different vendors may be connected and may provide common data storage for one or more host processors in a computer system.

There are at least two types of flash storage devices. A first type has a pre-defined mechanical dimension. This type includes: (a) Secure Digital (SD) card, (b) Multi Media Card (MMC), (c) Memory Stick (MS) card, (d) Compact Flash (CF) card, (e) Express Flash card, (f) Serial Advanced Technology Attachment (ATA) Flash disk, and (g) Small Computer System Interface (SCSI) Flash disk.

A second type of flash storage devices has no pre-defined physical dimension, which includes universal serial bus flash disk (USB), Disk On Module (DOM), and MP3 players. However, based upon the need for the system compactness, it is generally desirable to make this type of flash storage device as small in size and as high in capacity as possible.

Advances in semiconductor technology have led to an increase in the use of semiconductor solid state drives (also known as solid state disks or SSDs), which may use flash memory as a storage device, in areas such as computer systems. Thus, in at least some cases there may be a trend towards the use of SSDs 44 as storage devices 42 instead of, or in addition to, magnetic disks.

An SSD 44 has many features that can make it an attractive storage device 42. For example, SSDs 44 have a fast access rate, high throughput, a high integration density, and stability against an external impact. SSDs 44 can move large amounts of data and process a large number of IO requests. This allows users to complete data transactions much more quickly.

Furthermore, advances in manufacturing technologies for SSDs 44 may reduce the production costs of SSDs 44 and also increase the storage capacities of SSDs 44. These developments may provide incentive to use SSDs 44 in place of or in conjunction with magnetic disks in at least some cases.

A flash memory die is the basic element of flash memory. A typical flash memory chip comprises a flash memory die mounted on a substrate within an enclosure and the electrical signals are bonded out to the metal contacts of the package. Two popular package types for flash memory chips are WSOP (Very Very Small Out-line Package) and BGA (Ball Grid Array).

A flash memory die is composed of a number of cells that are used to store data. For instance, a single cell may store one, two, or more bits of data, depending on the design. Cells may be organized into one or more pages and pages may be grouped together to form blocks. For example, a page may contain 4 KB of data and a block may contain 128 pages or 512 KB of data.

One should appreciate that data storage systems may include different types of storage devices 42, such as flash drives and hard disk drives. Flash drives are typically specified as having an expected lifetime (e.g., as measured in an amount of actual elapsed time such as a number of years or months) based on a number of guaranteed write cycles at a particular rate or frequency at which the writes are performed. Thus, a flash drive may have a specified lifetime rating expressed in calendar or wall clock elapsed time based on the amount of time it takes to perform the number of guaranteed write cycles. SSDs 44 comprising flash memory devices may be referred to herein as flash drives; however SSDs may employ other memory technology such as nonvolatile Random Access Memory (NRAM) and the like.

It should also be noted that, although example embodiments discuss 4 KB SSD logical page configurations, such arrangements are by way of example only and other metadata page sizes and/or other SSD logical page sizes may be similarly implemented in cases the SSD logical page size is different. Further, the data storage systems described in example embodiments were for explanatory purposes and should not be construed as a limitation and the techniques may be applied to host systems, virtualization appliances, data base applications, servers, and the like.

Furthermore, one should further appreciate that the SSDs 44 may have a logical page size 98 significantly smaller than a HDD optimized page size. For example, some SSDs 44 use a logical page size of 4 KB. In this case, when writing data to the SSD 44, the minimum amount of data that can be written in a single write request is 4 KB even if only a small amount of data has actually been modified. For example, to write 256 bytes of data, the SSD 44 will perform a read-modify-write sequence by reading the current 4 KB page data, modify the data to reflect the new 256 bytes of data, and write the full modified 4 KB page to a new location and update the SSD's FTL page's corresponding indirection pointer.

Moreover, with HDDs having essentially unlimited write endurance and similar write times for small vs. large blocks, unnecessarily writing unmodified data along with small amounts of modified data is of little consequence when compared to the system performance improvements provided by reducing the number in I/O commands with larger writes.

As the cost of flash SSDs has decreased, system designers have begun increasingly augmenting or replacing HDDs with SSDs 44 to take advantage of the substantial I/O performance improvements inherent with SSD technology. However, unlike the unlimited write endurance with HDDs, the SSDs 44 have a finite number of write operations that can be performed by the SSD 44. Write endurance can be expressed in relation to the number of write cycles flash devices in a SSD 44 can perform before they are effectively worn out and can no longer be written to reliably. Endurance may be specified as, for example, writes per day over some time period (e.g., 100 GB per day over a 5 year period) or as total TB you can write in lifetime of device or other such metric. SSD manufacturers offer devices with varying wear endurance specs where higher endurance devices are generally more costly than lower endurance devices.

As a result, SSDs 44 are not as durable as HDDs when comparing the total number of write commands that can be performed. Furthermore, when SSDs 44 are utilized in a conventional HDD optimized system, the additional, unnecessary writes wear out write-limited SSDs 44 more quickly.

Advantageously, current techniques described herein provide a way to optimize SSD 44 writes in HDD optimized systems by reducing the number of writes sent to an SSD 44. Such techniques can increase the life of a SSD 44 or, alternatively, a less costly, lower endurance SSD 44 can be used while providing similar lifetime performance as compared to conventional methods.

It should be noted that data storage systems are used as a vehicle for describing various example embodiments; however, such discussion should not be construed as a limitation. The SSD write optimization techniques described herein may be similarly applied to other HDD write optimized systems and/or software (e.g., servers, operating systems, databases, applications, etc.) that write to SSDs 44.

Although the data storage environment 20 of FIG. 1 was described as including host computers 22 performing host operations and data storage equipment 24 which is separate from the host computers 22, other equipment configurations are suitable for use as well. In particular, the flash optimized layout techniques are well suited for alternative and/or specialized situations.

For example, the improved techniques disclosed herein are suitable for hyper-converged arrangements in which applications and storage processing run on the same equipment. Along these lines, different resources such as storage, compute, networking and/or virtualization may be combined into a single physical system. For example, for equipment that provides a virtualized environment, applications may be run on one set of virtual machines and storage processing may be provided by one or more other virtual machines.

Additionally, some applications (e.g., legacy applications) may have been originally written specifically for HDDs. These applications may be modified to use the flash optimized layouts disclosed herein so that such applications running on systems having SSDs benefit from less wear on the SSDs.

Furthermore, it should be understood that the various circuitry and components described herein may implement a variety of different protocols and/or technologies. For example, the earlier-described data storage equipment may support SCSI, the Network File System (NFS) protocol, the Common Internet File System (CIFS) protocol, object store or object-based storage, and so on. Such modifications and enhancements are intended to belong to various embodiments of the disclosure.

What is claimed is:

1. A method of managing data, the method comprising:
    identifying a logical page size utilized by a set of solid state drives (SSDs);
    based on a first data storage application which stores a first data element including first data in a set of hard disk drives (HDDs), creating a second data storage application which distributes the first data from the first data element among a plurality of second data elements, and stores the plurality of second data elements in the set of SSDs, the first data element having a first size which is larger than the logical page size utilized by the set of SSDs, and each second data element having a second size which is equal to the logical page size utilized by the set of SSDs; and
    operating the second data storage application, by processing circuitry coupled to the set of SSDs in response to a change in the first data, to store, in the set of SSDs, a portion of the plurality of second data elements that includes distributed data corresponding to the change in the first data, wherein the portion of the plurality of the second data elements includes only the change in the first data.

2. A method as in claim 1 wherein each SSD includes a SSD controller and internal flash memory; and
    wherein identifying the logical page size utilized by the set of SSDs includes:
        ascertaining, as the logical page size, a smallest unit of data that the SSD controller of each SSD can write to the internal flash memory of that SSD.

3. A method as in claim 2 wherein the SSD controller of each SSD manages a flash translation layer (FTL) which maps logical addresses to physical addresses of the internal flash memory of that SSD; and
    wherein ascertaining the smallest unit of data that the SSD controller of each SSD can write includes:
        discerning, as the logical page size, a mapping granularity utilized by the FTL managed by the SSD controller of each SSD.

4. A method as in claim 3 wherein creating the second data storage application includes:
    setting the second size of each second data element stored by the second data storage application to be 4 kilobytes (KB).

5. A method as in claim 2 wherein creating the second data storage application includes:
    generating, as the second data storage application, a data moving application which moves the first data from a cache to the set of SSDs.

6. A method as in claim 5 wherein operating the second data storage application includes:
    installing the data moving application on a set of storage processors of a data storage array, the data moving application performing host input/output (I/O) operations which store host data in the set of SSDs and load host data from the set of SSDs on behalf of a set of external host computers.

7. A method as in claim 5 wherein generating the data moving application includes:
    configuring the data moving application to store, in particular second data elements among the plurality of second data elements, (i) respective information and (ii) an error detection code for detecting errors in that respective information.

8. A method as in claim 7 wherein the first data storage application stores, in the first data element, (i) respective information and (ii) an error detection code for detecting errors in that respective information; and
    wherein the first data element is too large to fit in any of the particular second data elements.

9. A method as in claim 5 wherein generating the data moving application includes:
    configuring the data moving application to store, in particular second data elements among the plurality of second data elements, (i) a respective bitmap and (ii) a series of entries which is fully mapped by the respective bitmap.

10. A method as in claim 9 wherein the first data storage application stores, in the first data element, (i) a respective bitmap and (ii) a series of entries which is fully mapped by the respective bitmap; and
    wherein the first data element is too large to fit in any of the particular second data elements.

11. A method as in claim 5 wherein generating the data moving application includes:
    configuring the data moving application to store, in particular second data elements among the plurality of second data elements, (i) a respective data object and (ii) ancillary data which is different than that respective data object.

12. A method as in claim 11 wherein the first data storage application stores, in the first data element, (i) a respective data object and (ii) ancillary data which is different than that respective data object; and
    wherein the first data element is too large to fit in any of the particular second data elements.

13. A method as in claim 1 wherein operating the second data storage application further includes operating the second data storage application, in response to the change in the first data, to distribute the first data including the change in the first data from the first data element among the plurality of second data elements.

14. A method as in claim 1 wherein each respective second data element among the plurality of second data elements includes a portion of the first data distributed from the first data element, and wherein creating the second data storage application includes creating the second data storage application which:
    generates an error detection code (EDC) for the portion of the first data included in the respective second data element; and
    incorporates the EDC into the respective second data element.

15. A method as in claim 14 wherein the portion of the first data included in the respective second data element corresponds to the change in the first data, and wherein creating the second data storage application further includes creating the second data storage application which:
    regenerates the EDC for the portion of the first data included in the respective second data element;
    incorporates the regenerated EDC into the respective second data element; and stores the respective second data element, including (i) the portion of the first data corresponding to the change in the first data and (ii) the regenerated EDC, in the set of SSDs.

16. Electronic apparatus, comprising:
an interface constructed and arranged to connect with a set of solid state drives (SSDs);
memory; and
control circuitry coupled to the interface and the memory, the memory storing instructions which, when carried out by the control circuitry, cause the control circuitry to:
(i) after a logical page size utilized by a set of solid state drives (SSDs) is identified and (ii) after, based on a first data storage application which stores a first data element including first data in a set of hard disk drives (HDDs), a second data storage application is created which distributes the first data from the first data element among a plurality of second data elements, and stores the plurality of second data elements in the set of SSDs, operate the second data storage application, in response to a change in the first data, to store, in the set of SSDs, a portion of the plurality of second data elements that includes distributed data corresponding to the change in the first data, wherein the portion of the plurality of the second data elements includes only the change in the first data, the first data element having a first size which is larger than the logical page size utilized by the set of SSDs, and each second data element having a second size which is equal to the logical page size utilized by the set of SSDs.

17. Electronic apparatus as in claim 16 wherein each SSD includes a SSD controller and internal flash memory; and
wherein the logical page size is a smallest unit of data that the SSD controller of each SSD can write to the internal flash memory of that SSD.

18. Electronic apparatus as in claim 17 wherein the SSD controller of each SSD manages a flash translation layer (FTL) which maps logical addresses to physical addresses of the internal flash memory of that SSD; and
wherein the logical page size equals a mapping granularity utilized by the FTL managed by the SSD controller of each SSD.

19. Electronic apparatus as in claim 18 wherein the second data storage application includes a set of data moving applications which moves the first data from a cache to the set of SSDs.

20. Electronic apparatus as in claim 19 wherein the set of data moving applications includes:
a first data moving application which stores, in at least a first portion of the plurality of second data elements, (i) respective information and (ii) an error detection code for detecting errors in that respective information;
a second data moving application which stores, in at least a second portion of the plurality of second data elements, (i) a respective bitmap and (ii) a series of entries which is fully mapped by the respective bitmap; and
a third data moving application which stores, in at least a third portion of the plurality of second data elements, (i) a respective data object and (ii) ancillary data which is different than that respective data object.

21. Electronic apparatus as in claim 20 wherein the second size of each second data element stored by the second data storage application is 4 kilobytes (KB).

22. A computer program product having a non-transitory computer readable medium which stores a set of instructions to manage data;
the set of instructions, when carried out by computerized circuitry, causing the computerized circuitry to perform a method of:
identifying a logical page size utilized by a set of solid state drives (SSDs);
based on a first data storage application which stores a first data element including first data in a set of hard disk drives (HDDs), creating a second data storage application which distributes the first data from the first data element among a plurality of second data elements, and stores the plurality of second data elements in the set of SSDs, the first data element corresponding to a block of data having a first size which is larger than the logical page size utilized by the set of SSDs, and each second data element corresponding to a page of data having a second size which is equal to the logical page size utilized by the set of SSDs; and
operating the second data storage application, in response to a change in the first data, to store, in the set of SSDs, a portion of the plurality of second data elements that includes distributed data corresponding to the change in the first data, wherein the portion of the plurality of the second data elements includes only the change in the first data.

* * * * *